US009005429B2

(12) United States Patent
Markkanen et al.

(10) Patent No.: US 9,005,429 B2
(45) Date of Patent: Apr. 14, 2015

(54) PROCESS FOR THE MANUFACTURE OF HYDROCARBON COMPONENTS

(75) Inventors: Varpu Markkanen, Vantaa (FI); Petri Lindqvist, Porvoo (FI); Elina Harlin, Kerava (FI); Pekka Aalto, Porvoo (FI); Jukka Myllyoja, Vantaa (FI); Ville Alopaeus, Espoo (FI)

(73) Assignee: Neste Oil Oyj, Espoo (FI)

( * ) Notice: Subject to any disclaimer, the term of this patent is extended or adjusted under 35 U.S.C. 154(b) by 547 days.

(21) Appl. No.: 12/495,263

(22) Filed: Jun. 30, 2009

(65) Prior Publication Data

US 2010/0000908 A1    Jan. 7, 2010

Related U.S. Application Data

(60) Provisional application No. 61/077,342, filed on Jul. 1, 2008.

(51) Int. Cl.
 C10G 3/00 (2006.01)
 C10G 65/04 (2006.01)
 C10G 45/64 (2006.01)

(52) U.S. Cl.
 CPC .............. *C10G 65/043* (2013.01); *C10G 45/64* (2013.01); *C10G 3/46* (2013.01); *C10G 3/50* (2013.01); *C10G 2300/1014* (2013.01); *C10G 2300/1018* (2013.01); *C10G 2300/1055* (2013.01);
 (Continued)

(58) Field of Classification Search
 USPC ......... 208/63, 64, 66, 134, 141; 585/240, 242
 See application file for complete search history.

(56) References Cited

U.S. PATENT DOCUMENTS 4,921,593 A * 5/1990 Smith ............................ 208/59
6,103,101 A   8/2000 Fragelli et al.
(Continued)

FOREIGN PATENT DOCUMENTS

CA    2 718 519 A1    9/2009
CA    2 718 664 A1    12/2009
(Continued)

OTHER PUBLICATIONS

British Ministry of Defence DEF STAN 91-91/Issue 6 of 8, Apr. 2008 for Turbine Fuel, Aviation Kerosine Type, Jet A-1, NATO code F-35, Joint Service Designation: AVTUR, pp. 1-23.
(Continued)

*Primary Examiner* — Renee E Robinson
(74) *Attorney, Agent, or Firm* — Birch, Stewart, Kolasch & Birch, LLP

(57) ABSTRACT

The present invention relates to hydrocarbons and particularly to the manufacture of hydrocarbon components suitable as aviation fuels or jet fuels and as blending stocks for aviation fuels. The process comprises the stages, wherein in the first stage an oil feed of biological origin and hydrogen gas are subjected to conditions sufficient to effect hydrodeoxygenation in the presence of a hydrodeoxygenation catalyst to yield n-paraffins; in the second stage the n-paraffins and hydrogen gas are subjected to conditions sufficient to effect isomerization in the presence of an isomerization catalyst to yield isoparaffins and separating fractions; and recycling the fraction boiling at a temperature above 200° C. under atmospheric pressure obtained from the second stage to reisomerization, where isomerization is effected in the presence of an isomerization catalyst.

3 Claims, 3 Drawing Sheets

(52) U.S. Cl.
CPC .... *C10G2300/4081* (2013.01); *C10G 2400/02* (2013.01); *C10G 2400/04* (2013.01); *C10G 2400/08* (2013.01)

(56) References Cited

U.S. PATENT DOCUMENTS

| | | |
|---|---|---|
| 2002/0175109 A1 | 11/2002 | Ragil et al. |
| 2006/0111599 A1 | 5/2006 | Lamprecht et al. |
| 2007/0010682 A1 | 1/2007 | Myllyoja et al. |
| 2008/0052983 A1 | 3/2008 | Aulich et al. |
| 2008/0244962 A1* | 10/2008 | Abhari et al. .......... 44/308 |
| 2009/0229172 A1 | 9/2009 | Brady et al. |
| 2009/0301930 A1* | 12/2009 | Brandvold et al. .......... 208/17 |

FOREIGN PATENT DOCUMENTS

| | | |
|---|---|---|
| CN | 1854265 A | 11/2006 |
| EP | 1396531 A2 | 3/2004 |
| FI | 100248 B | 10/1997 |
| JP | 2011-515539 A | 5/2011 |
| WO | WO-2006/010068 A1 | 1/2006 |
| WO | WO-2007/027669 A1 | 3/2007 |
| WO | WO-2007/027955 A2 | 3/2007 |
| WO | WO-2007/068797 A2 | 6/2007 |
| WO | WO-2007/110448 A1 | 10/2007 |
| WO | WO 2008/058664 A1 | 5/2008 |
| WO | WO 2009/117337 A2 | 9/2009 |
| WO | WO 2009/151692 A2 | 12/2009 |

OTHER PUBLICATIONS

Aviation Fuel Quality Requirement for Jointly Operated Systems, AFORJOS, Jun. 2007, Bulletin No. 12, pp. 1-8.
Japanese Office Action dated Apr. 2, 2013 for corresponding Japanese Patent Application No. 2011-515507, with partial EnglishTranslation.
Search Report dated Feb. 8, 2013 for corresponding Chinese Patent Application No. 200980124964.4 with English Translation.
Eurasian Search Report for Eurasian Application No. 201170120 dated Apr. 4, 2013.
European Office Action for European Application No. 08159379.0, dated Jul. 19, 2013.
Canadian Search Report dated Nov. 8, 2013 for Application No. 2,729,651.

* cited by examiner

PROCESS FOR THE MANUFACTURE OF HYDROCARBON COMPONENTS

This Nonprovisional application claims priority under 35 U.S.C. §119(e) on U.S. Provisional Application No. 61/077,342 filed on Jul. 1, 2008, the entire contents of which are hereby incorporated by reference into the present application.

FIELD OF THE INVENTION

The present invention relates to hydrocarbons and particularly to the manufacture of hydrocarbon components suitable as aviation fuels or jet fuels and as blending stocks for aviation fuels. The present invention also relates to a process for the manufacture of hydrocarbons from renewable starting materials of biological origin. Particularly the invention provides an alternative process for the manufacture of high quality aviation fuels or blending stocks or components for aviation fuels, based on biological starting materials.

BACKGROUND OF THE INVENTION

Aviation fuels or jet fuels are traditionally manufactured from crude mineral oil, which is typically separated by means of distillation into straight run kerosene fraction boiling in the aviation fuel range, and if required, followed by optional conversion processes like cracking etc. well known in the art. Mineral oil derived kerosene meeting aviation fuel requirements may also be produced for example by hydroprocessing or by caustic washing of straight run kerosene.

The Fischer-Tropsch process, where carbon monoxide and hydrogen are reacted over an iron, cobalt, nickel or ruthenium containing catalyst to produce a mixture of straight and branched chain hydrocarbons and smaller amounts of oxygenates, is increasingly used for the manufacture of aviation fuels. Synthesis gas used as the starting material may be derived from coal, natural gas, biomass or heavy oil streams. The resulting mixtures, predominantly containing linear paraffins, are fractionated and the fraction boiling in the aviation fuel range is separated and used as a component in aviation turbine fuels, as described in WO 2007/110448.

US 2006/0111599 describes a process where modified Low Temperature Fischer-Tropsch (LTFT) feedstock is fractionated and optionally blended to obtain low sulphur aviation turbine fuel. A product having a final boiling point of about 270° C. is obtained, typically containing a blend of isoparaffins and n-paraffins.

WO 2007/027955 presents a method for preparing a hydrocarbon product suitable as jet fuel. In the process a feedstock comprising C10-C20 fatty acids, originating from any source of triglycerides, is subjected to thermal decarboxylation, followed by combining the obtained product with olefin containing material and carrying out olefin metathesis and then performing dehydrogenation if the metathesis product is saturated, followed with optional hydrogenation.

WO 2007/027669 teaches a process for preparing a hydrocarbon product suitable as jet fuel. In said process a feedstock comprising C10-C20 fatty acids, originating from any source of triglycerides is subjected to Kolbe electrolysis, yielding a product, which is combined with olefin containing material and carrying out olefin metathesis and then performing dehydrogenation if the metathesis product is saturated, followed with optional isomerisation.

Often aviation turbine fuels comprise blends of fractions and components obtained using different processes.

In patent FI 100248 a two-step process is described for producing middle distillate, where fatty acids and triglycerides of fatty acids, contained in plant oils are hydrogenated to n-paraffins, which are subsequently isomerised to isoparaffins. A hydrocarbon product is obtained with cold temperature properties not suitable for aviation fuels.

Typical characteristics of aviation fuels are presented in the following. Aviation fuel is a product boiling for more than 90 vol % at from 130 to 300° C. (ASTM D86), having the density from 775 to 840 kg/m$^3$, preferably from 780 to 830 kg/m$^3$ at 15° C. temperature (ASTM D4052), an initial boiling point in the range 130 to 160° C. and final boiling point in the range 220 to 300° C. (ASTM D86), a kinematic viscosity at −20° C. temperature in the range 1.2 to 8.0 mm$^2$/s (ASTM D445), a freezing point below −40° C., preferably below −47° C. (ASTM D2386) and a flash point at least 38° C. (IP 170).

The minimum requirements for the quality and properties of aviation turbine fuels are defined in several standards. Jet A-1 requirements in the standard DEF STAN 91-91 (British Ministry of Defence Standard DEF STAN 91-91/Issue 6 of 8 Apr. 2008 for Turbine Fuel, Aviation Kerosine Type, Jet A-1, NATO code F-35, Joint Service Designation AVTUR, or versions current at the time of testing) or in the "Check List" (Aviation Fuel Quality Requirements for Jointly Operated Systems, AFQRJOS), are based on the most stringent requirements of ASTM D1655, DEF STAN 91-91 and IATA, Guidance Material for Aviation Turbine Fuels Specifications, some airport handling requirements. "Semi-synthetic" aviation fuels were approved in 1999 under DEF STAN 91-91 and a fully synthetic jet fuel was approved in 2008. Aviation fuel meeting the requirements of AFORJOS requirements are referred as "Jet A-1 to Check List" or "Check List Jet A-1" fuels.

There can appear some problems relating to the use of isoparaffinic aviation turbine fuels with respect to the lubricity, thermal stability, oxidation stability, storage stability, water separation characteristics, antifreeze properties and electric conductivity. Therefore suitable additives are often needed for solving said problems. The use of at most five different qualified additives is allowed simultaneously in an aviation fuel, and typically from 1 to 3 different additives selected from the approved additives listed in DEF STAN 91-91/6 are used in aviation fuels.

Static dissipator additive (SDA) is always required for adjusting and maintaining the electric conductivity above 50 pS/m during the operating conditions. It is particularly important during the refuelling conditions when modern rapid refuelling equipment is used. Said equipment may cause formation of static electricity, which may result sparking and even serious refuelling fires if the electric conductivity of the fuel is not sufficient.

Antioxidants are generally used for improving the stability of the fuels and they decrease or prevent the formation of precipitates during the storage of the fuel.

Lubricity improving additives (LIA) are used for improving the lubricity and simultaneously they act as corrosion inhibitors in aviation fuels, particularly in military use and when the product contains more than 95% of hydroprocessed product.

Metal deactivators (MDA) prevent metals from reacting with fuels, which decreases thermal stability significantly.

Fuel system icing inhibitors (FSII) are used predominantly in military practice.

The availability of fossil aviation fuels will decrease in the future and thus there is an evident need to provide alternative sources and processes for producing aviation turbine fuels. Also, it can be expected that air traffic will increase in the future, resulting in an increase in the demand for aviation fuels. The requirements to cut down the problems and harm caused to the environment and health are continuously tightened and a general object is to provide aviation fuels, which are less harmful to the environment. An object is also to cut down the emissions to a substantially lower level and particularly to decrease significantly the carbon dioxide emissions. It can also be seen that there is a growing interest in developing new fuels based on renewable materials instead of using products derived from crude oil etc. fossil material.

Based on the above it can be seen that there exists an evident need for a new and improved process for the manufacture of hydrocarbon components suitable as high quality aviation fuels or as blending stocks for said fuels, which process enables to avoid or at least to decrease significantly the problems relating to present aviation fuels and their manufacture. Additionally there is a need to utilize starting materials based on renewable sources in said manufacturing process.

OBJECT OF INVENTION

An object of the invention is a process for the manufacture of hydrocarbons.

A further object of the invention is a process for the manufacture of hydrocarbon components suitable as aviation fuels or blending stocks for aviation fuels.

A still further object of the invention is a process for the manufacture of aviation fuels or blending stocks for aviation fuels from biological and renewable starting materials.

A still further object of the invention is a process for the manufacture of components or blending stocks for aviation fuels complying with Jet A-1 requirements, from biological and renewable starting materials.

Characteristic features of the invention are provided in the claims.

DEFINITIONS

Here aviation fuel is understood to mean aviation turbine fuel or jet fuel, suitable for aviation purposes.

Bio jet fuel means aviation fuel derived from biological starting materials.

Here hydroprocessing is understood as catalytic processing of organic material by all means of molecular hydrogen.

Here hydrotreatment is understood as a catalytic process, which removes oxygen from organic oxygen compounds as water (hydrodeoxygenation, HDO), sulphur from organic sulphur compounds as dihydrogen sulphide ($H_2S$) (hydrodesulphurisation, HDS), nitrogen from organic nitrogen compounds as ammonia ($NH_3$) (hydrodenitrogenation, HDN) and halogens, such as chloride from organic chloride compounds as hydrochloric acid (HCl) (hydrodechlorination, HDCl), typically under the influence of a catalyst.

Here deoxygenation is understood to mean removal of oxygen from organic molecules, such as fatty acid derivatives, alcohols, ketones, aldehydes or ethers by any means previously described.

Here hydrodeoxygenation (HDO) of triglycerides or other fatty acid derivatives or fatty acids is understood to mean the removal of carboxyl oxygen as water by the means of molecular hydrogen under the influence of a catalyst.

Here decarboxylation and/or decarbonylation of triglycerides or other fatty acid derivatives or fatty acids is understood to mean removal of carboxyl oxygen as $CO_2$ (decarboxylation) or as CO (decarbonylation) with or without the influence of molecular hydrogen.

Here hydrocracking is understood as catalytic decomposition of organic hydrocarbon materials using molecular hydrogen at high pressures.

Here hydrogenation means saturation of carbon-carbon double bonds by the means of molecular hydrogen under the influence of a catalyst.

Here n-paraffins mean normal alkanes or linear alkanes containing no side chains.

Here isoparaffins means alkanes having one or more $C_1$-$C_9$, typically $C_1$-$C_2$ alkyl side chains, typically mono-, di-, tri- or tetramethylalkanes.

The feed (total feed) to the first process step is to be understood comprising fresh feed and optionally at least one dilution agent.

Typical boiling range of gas is from −162 to 40° C., typically comprising $C_1$-$C_5$ hydrocarbons.

Typical boiling range of gasoline is from 40 to 210° C., typically comprising $C_5$-$C_{10}$ hydrocarbons.

Typically aviation fuel comprises $C_8$-$C_{16}$ hydrocarbons, and typically the initial boiling point being in the range 130 to 160° C. and final boiling point in the range 220 to 300° C.

Typical boiling range of diesel fuel is from 160 to 360° C., typically comprising $C_{10}$-$C_{28}$ hydrocarbons.

Boiling temperatures refer to temperatures under normal atmospheric pressures unless otherwise provided.

SUMMARY OF THE INVENTION

The present invention is directed to a process for the manufacture of hydrocarbons and hydrocarbon components. The resulting hydrocarbon components are useful as high quality aviation fuels and as blending stocks or components for high quality aviation fuels. Also hydrocarbon components useful as diesel fuels are obtained as well as components suitable as gas and gasoline.

The processing is illustrated in the schemes presented in the appended Figures.

The process comprises the stages where a feed derived from renewable sources is hydrodeoxygenated and isomerised, followed by separation of the fractions boiling in the gas range, in the gasoline range, in the aviation fuel range and optionally separating the fraction boiling in the diesel fuel range, and then subjecting the fraction boiling at a temperature at or above 200° C. (particularly from ≥200° C. to 650° C.) under atmospheric pressure (heavy recycle stream from the isomerisation) and optionally the faction boiling in the diesel fuel range to second isomerisation. The product is separated into components using any suitable separation technique.

Hydrocarbon components comprising isoparaffins are obtained, the component boiling in the aviation fuel range being particularly suitable as isoparaffinic aviation fuel or as blending stock for aviation fuels. Aviation fuels and blending stock for aviation fuels with excellent cold properties and particularly with remarkably low freezing point, even meeting the requirements for Jet A-1 grade can be obtained.

The process according to the invention comprises a hydrodeoxygenation stage followed by an isomerisation stage, separating then the lighter fractions from the isomerised product and reisomerising the fraction boiling at a temperature at or above 200° C. (heavy recycle stream).

Particularly the process comprises the stages, wherein in the first stage (hydrodeoxygenation) an oil feed of biological origin and hydrogen gas are subjected to conditions sufficient to effect hydrodeoxygenation in the presence of a hydrodeoxygenation catalyst to yield n-paraffins;

in the second stage (isomerisation) the n-paraffins and hydrogen gas are subjected to conditions sufficient to effect isomerisation in the presence of an isomerisation catalyst to yield isoparaffins; and separating the fractions boiling in the gas range, in the gasoline range, in the aviation fuel range and optionally separating the fraction boiling in the diesel fuel range, reisomerising ($2^{nd}$ isomerisation) the fraction boiling at a temperature at or above 200° C. (heavy recycle stream) and optionally the faction boiling in the diesel fuel range in the presence of an isomerisation catalyst; and then separating the obtained isoparaffinic hydrocarbon components.

The reisomerisation may be carried out in three alternative ways:

1) The heavy recycle stream and optionally the fraction boiling in the diesel fuel range or part of it is recycled and combined with the feed to the second stage (isomerisation) and isomerised; or
2) The heavy recycle stream and optionally the fraction boiling in the diesel fuel range or part of it is recycled and passed to a first section of the second stage (isomerisation) comprising at least two sections and isomerised, the n-paraffins obtained from the first stage (hydrodeoxygenation) being passed to the second section of the isomerisation stage and isomerised; or
3) The heavy recycle stream and optionally the fraction boiling in the diesel fuel range or part of it is recycled and passed to the third stage (isomerisation) and isomerised.

BRIEF DESCRIPTION OF THE DRAWINGS

The appended

In FIG. 1 in the first reaction stage (hydrodeoxygenation) pretreated feed in stream 1 is mixed with recycle gas in stream 2, which is a mixture of recycled gas and make-up hydrogen gas 8. The combined stream 3 is passed to the catalyst bed of the reaction section A comprising a hydrodeoxygenation catalyst. Reaction section A may comprise one or several catalysts beds. The hydrodeoxygenated effluent 4 from the reaction section A enters the separator B (for example a stripper) and the vapour stream 5 containing hydrogen, light gases, $CO_2$ and water, is passed to gas purification section F for gas purification and recycling. The vapour stream 6 from the separator B is passed to gas purification section F for gas purification and recycling, and the liquid stream 7 is combined with hydrogen stream 8. In the second reaction stage (isomerisation) the combined stream 9 enters the reaction section C comprising an isomerisation catalyst. The reaction section C may comprise one or several catalysts beds. The isomerised liquid effluent 10 from the reaction section C is passed to fractionator D where fractions boiling in the gas range 12, gasoline range 13, aviation fuel range 14 and optionally the fraction boiling in the diesel fuel range 15 or part of it are separated by distillation. The heavy recycle stream, fraction 16, optionally combined with the fraction 15 or part of it, is recycled as stream 17, which is combined with stream 9. The vapour stream 11 containing hydrogen, light gases, $CO_2$ and water, is passed to gas purification section F for gas purification and recycling. Optionally part of stream 16 is taken out as stream 18 to be used as diesel fuel component.

In FIG. 2 in the first reaction stage (hydrodeoxygenation) pretreated feed in stream 1 is mixed with recycle gas in stream 2, which is a mixture of recycled gas and make-up hydrogen gas 8. The combined stream 3 is passed to the catalyst bed of the reaction section A comprising a hydrodeoxygenation catalyst. Reaction section A may comprise one or several catalysts beds. The hydrodeoxygenated effluent 4 from the reaction section A enters the separator B (for example a stripper) and the vapour stream 5 containing hydrogen, light gases, $CO_2$ and water, is passed to gas purification section F for gas purification and recycling. The vapour stream 6 from the separator B is passed to gas purification section F for gas purification and recycling, and the liquid stream 7 is combined with hydrogen stream 8. In the second reaction stage (isomerisation) the combined stream 9 enters the catalyst bed of the second subsection $C_2$ of the reaction section C comprising at least two subsections $C_1$ and $C_2$, comprising an isomerisation catalyst. Reaction section C may comprise one or several catalysts beds in each subsection $C_1$ and $C_2$. The isomerised liquid effluent 10 from the reaction section C is passed to fractionator D where fractions boiling in the gas range 12, gasoline range 13, aviation fuel range 14 and optionally the fraction boiling in the diesel fuel range 15 or part of it are separated by distillation. The heavy recycle stream, fraction 16, optionally combined with the fraction 15 or part of it, is recycled as stream 17, which is combined with hydrogen stream 8 and the combined stream 19 is passed to the catalyst bed of the first subsection $C_1$ of the reaction section C. The vapour stream 11 containing hydrogen, light gases, $CO_2$ and water, is passed to gas purification section F for gas purification and recycling. Optionally part of stream 16 is taken out as stream 18 to be used as diesel fuel component.

In FIG. 3 in the first reaction stage (hydrodeoxygenation) pretreated feed in stream 1 is mixed with recycle gas in stream 2, which is a mixture of recycled gas and make-up hydrogen gas 8. The combined stream 3 is passed to the catalyst bed of the reaction section A comprising a hydrodeoxygenation catalyst. Reaction section A may comprise one or several catalysts beds. The hydrodeoxygenated effluent 4 from the reaction section A enters the separator B (for example stripper) and the vapour stream 5 containing hydrogen, light gases, $CO_2$ and water, is passed to gas purification section F for gas purification and recycling. The vapour stream 6 from the separator B is passed to gas purification section F for gas purification and recycling and the liquid stream 7 is combined with hydrogen stream 8. In the second reaction stage (isomerisation) the combined stream 9 enters the reaction section C comprising an isomerisation catalyst. Reaction section C may comprise one or several catalysts beds. The isomerised liquid effluent 10 from the reaction section C is passed to fractionator D where fractions boiling in the gas range 12, gasoline range 13, aviation fuel range 14 and optionally the fraction boiling in the diesel fuel range 15 or part of it are separated by distillation. The heavy recycle stream, fraction 16, optionally combined with the fraction 15 or part of it, is recycled as stream 17, which is combined with hydrogen gas stream 8. In the third reaction stage (isomerisation), the combined stream 19 is passed to the reaction section E comprising an isomerisation catalyst. Reaction section E may comprise one or several catalysts beds. The isomerised liquid effluent 20 is combined with stream 10 and passed to fractionator D and the vapour stream 21 is passed to gas purification section F for gas purification and recycling. Optionally part of stream 16 is taken out as stream 18 to be used as diesel fuel component.

Figure 1:
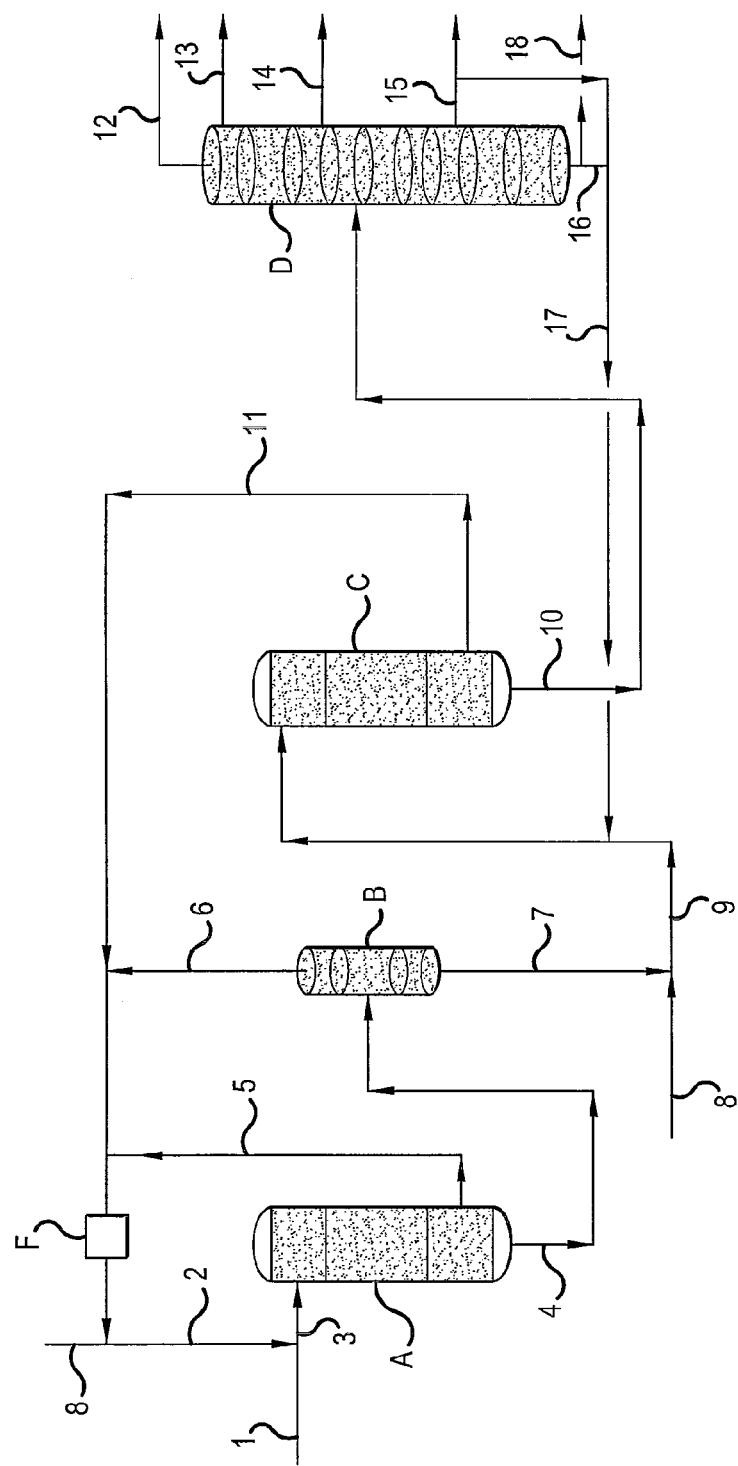
FIGS. 1-3 illustrate three embodiments of the invention where the heavy recycle stream (fraction boiling at a temperature at or above 200° C. under atmospheric pressure) is recycled and reisomerized after the second stage (isomerisation). These embodiments are examples of the invention, to which the invention is not meant to be limited only.

Each reaction section may comprise one or several catalyst beds.

Optionally part of the liquid effluent 10 from the reaction section C may be recycled and combined with stream 9 (not shown in the figures).

Optionally the fraction in the diesel duel range or part of it may be combined with the heavy recycle stream and resiomerised, depending of the optimisation and operation of the process.

DETAILED DESCRIPTION OF THE INVENTION

It was surprisingly found that hydrocarbons and particularly isoparaffinic hydrocarbon components, suitable as high quality aviation fuel or components or blending stocks for high quality aviation fuels can be obtained with the process according to the invention, which comprises the stages, wherein in the first stage an oil feed of biological origin and hydrogen gas are subjected to conditions sufficient to effect hydrodeoxygenation in the presence of a hydrodeoxygenation catalyst to yield n-paraffins;

in the second stage the n-paraffins and hydrogen gas are subjected to conditions sufficient to effect isomerisation in the presence of an isomerisation catalyst to yield isoparaffins; and recycling the fraction boiling at a temperature at or above 200° C. (particularly from ≥200° C. to 650° C.) under atmospheric pressure (heavy recycle stream), obtained from the second stage, optionally combined with the fraction boiling in the diesel fuel range or part of it, to reisomerisation, where isomerisation is effected in the presence of an isomerisation catalyst. Depending on the distillation apparatus and on the desired yield of diesel fuel or aviation fuel component, the heavy recycle stream may be comprise the fraction boiling at a temperature at or above 250° C. or the fraction boiling at a temperature at or above 290° C., the upper limit of the boiling range being 650° C. in both cases, if required.

The reisomerisation may be carried out in three alternative ways:
1) The heavy recycle stream (fraction boiling at a temperature at or above 200° C.) and optionally the fraction boiling in the diesel fuel range or part of it is recycled and combined with the feed to the second stage (isomerisation) and reisomerized; or
2) The heavy recycle stream (fraction boiling at a temperature at or above 200° C.) and optionally the fraction boiling in the diesel fuel range or part of it is recycled and passed to a first section of the second stage (isomerisation) comprising at least two sections and isomerised, the n-paraffins obtained from the first stage (hydrodeoxygenation) being passed to the second section of the isomerisation stage and isomerised; or
3) The heavy recycle stream (fraction boiling at a temperature at or above 200° C.) and optionally the fraction boiling in the diesel fuel range or part of it is recycled and isomerised in a third stage (isomerisation).

A preferable embodiment of the invention is described as follows. The process according to the invention comprises at least two stages, each stage having at least one reaction zone, said process comprising the steps:
a) combining an oil feed of biological origin with a hydrogen containing gas stream to form a feedstock;
b) passing the feedstock to a reaction zone of the first stage, which is maintained at conditions sufficient to effect hydrodeoxygenation and contacting it with a hydrodeoxygenation catalyst;
c) passing the effluent from step (b) to a separator where it is separated into an overhead fraction and bottoms fraction;
d) mixing the bottoms fraction from step (c) with a hydrogen containing gas stream;
e) passing the combined stream from step (d) to a reaction section of the second stage, which is maintained at conditions sufficient to effect isomerisation and contacting it with an isomerisation catalyst;
f) passing the effluent from step (e) to fractionation, thereby producing isomerized product streams, removing the stream boiling in the gas range, the stream boiling in the gasoline range, the stream boiling in the aviation fuel range and optionally the stream boiling in the diesel fuel range or part of it;
g) recycling the fraction boiling at a temperature at or above 200° C. (heavy recycle stream) and optionally the fraction boiling in the diesel fuel range or part of it from step (f) to reisomerisation.

The resisomerisation may be carried out in the alternative ways described above.

Feedstock

The bio oil and/or fat used as the fresh oil feed in the process of the present invention originates from biological and renewable sources, such as plants and/or animals and/or fish and/or insects, and from processes utilizing microbes, such as algae, bacteria, yeasts and moulds, and suitable are also compounds derived from said fats and oils and mixtures thereof. The species yielding the bio oils or fats may be natural or genetically engineered. The bio oils and fats may be virgin oils and fats or recycled oils and fats.

The basic structural unit of a typical plant or animal oil/fat is a triglyceride, which is a triester of glycerol with three fatty acid molecules, having the structure presented in the following formula I:

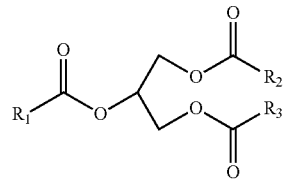

Formula 1

Structure of triglyceride.

In formula I $R_1$, $R_2$ and $R_3$ are alkyl chains. Fatty acids found in natural triglycerides are almost solely fatty acids of even carbon number. Therefore $R_1$, $R_2$, and $R_3$ typically are $C_5$-$C_{23}$ alkyl groups, mainly $C_{11}$-$C_{19}$ alkyl groups and most typically $C_{15}$ or $C_{17}$ alkyl groups. $R_1$, $R_2$, and $R_3$ may contain carbon-carbon double bonds. These alkyl chains can be saturated, unsaturated or polyunsaturated.

Suitable bio oils containing fatty acids and/or fatty acid esters and/or fatty acid derivatives are wood-based and other plant-based and vegetable-based fats and oils such as rapeseed oil, colza oil, canola oil, tall oil, Jatropha seed oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above, as well as fats and oils originating from processes utilizing microbes, such as algae, bacteria, yeasts and moulds.

Bio oil and fat suitable as fresh feed may comprise $C_{12}$-$C_{24}$ fatty acids, derivatives thereof such as anhydrides or esters of fatty acids as well as triglycerides and diglycerides of fatty acids or combinations of thereof. Fatty acids or fatty acid derivatives, such as esters may be produced via hydrolysis of bio oils or by their fractionalization or transesterification reactions of triglycerides or microbiological processes utilizing microbes.

In order to avoid catalyst deactivation and undesired side reactions it is advantageous that the feed complies with the following requirements: The amount of alkaline and alkaline earth metals, calculated as elemental alkaline and alkaline earth metals, in the feed is below 10, preferably below 5 mg/kg. The amount of other metals, calculated as elemental metals, in the feed is below 10, preferably below 5 mg/kg. The amount of phosphorus, calculated as elemental phosphorus is below 30, preferably below 15 mg/kg.

In many cases the oil feed, such as crude plant oil or animal fat, is not suitable as such in processing because of high impurity content and thus the feed is preferably pretreated using one or more conventional purification procedures before introducing it to the hydrodeoxygenation step of the process. Examples of some conventional purification/pretreatment procedures are provided below.

Degumming of plant oils/fats and animal oils/fats means the removal of phosphorus compounds, such as phospholipids. Solvent extracted vegetable oils often contain significant amounts of gums, which are mostly phosphatides (phospholipids). Iron and also other metals may be present in the form of metal-phosphatide complexes.

Degumming is typically performed by washing the feed at an elevated temperature and pressure with an acid, base and soft water and separating the formed gums, also a major amount of metal components are removed.

A feed, which is optionally degummed or refined in another conventional way, may be bleached with natural or acid activated bleaching clay. Bleaching removes various impurity traces left from other pretreatment steps, such as chlorophyll, carotenoids, phospholipids, metals, soaps and oxidation products. Generally the goal of bleaching is to reduce the color pigments and to reduce the oxidation tendency of oil.

Optionally the triglyceride structures of the feed may be decomposed by prehydrogenating the double bonds using reduced reaction temperature with suitable catalyst, prior to the hydrodeoxygenation in order to prevent double bond polymerisation of unsaturated triglycerides.

In the following the hydrodeoxygenation stage and the isomerisation stages are described in more detail.

Hydrodeoxygenation

In the hydrodeoxygenation stage fatty acids, triglycerides and other fatty acid derivatives comprised in the feed are deoxygenated, denitrogenated and desulphurisated.

In the hydrodeoxygenation stage the reaction conditions include a pressure between 10 and 150 bar, preferably between 30 and 70 bar; a temperature between 200 and 400° C., preferably between 250 and 350° C. and most preferably between 280 and 340° C.; and a feed rate (LHSV) of 0.1-10 hr-1 (v/v).

In the hydrodeoxygenation stage, known hydrogenation catalysts containing metals from Group VIII and/or VIB of the Periodic System of Elements may be used. Preferably, the hydrogenation catalyst is supported Pd, Pt, Ni, NiMo or a CoMo catalyst, the support being alumina and/or silica, as described for instance in FI 100248. Typically, NiMo/$Al_2O_3$ and CoMo/$Al_2O_3$ catalysts are used.

Hydrodeoxygenation of triglycerides facilitates controlled decomposition of the triglyceride molecule contrary to uncontrolled cracking. Double bonds are also hydrogenated during the controlled hydrotreatment. Light hydrocarbons and gases formed, mainly propane, water, $CO_2$, CO, $H_2S$ and $NH_3$ are removed from the hydrodeoxygenated product.

Optionally the feed may comprise fresh feed and at least one dilution agent selected from hydrocarbons and recycled product of the process.

Organic or inorganic sulphur compound may optionally be fed along with hydrogen or with the feed to promote deoxygenation through decarb-reactions if desired.

The hydrodeoxygenation stage is followed by an isomerisation stage.

In the process according to the invention, the feed into the isomerisation reactor is a mixture of n-paraffins and the composition of it can be predicted from the fatty acid distribution of individual bio oils of the feed. During the hydrotreating step of the process, triglyceride oils and other fatty acid derivatives and fatty acids are almost theoretically converted to n-paraffins. Additionally propane is formed from the glycerol part of triglycerides, water and COx from carboxylic oxygen, $H_2S$ from organic sulphur compounds and $NH_3$ from organic nitrogen compounds. It is advantageous for the process that these gas phase impurities are removed before the hydrocarbons are contacted with the isomerisation catalyst.

The reaction product from the hydrodeoxygenation stage is subjected to separation and the effluent containing the n-paraffins is passed to the second stage, isomerisation.

Isomerisation

In the isomerisation stage the reaction conditions include a pressure between 10 and 150 bar, preferably between 30 and 100 bar; a temperature between 200 and 500° C., preferably between 280 and 400° C.; and a feed rate (LHSV) of 0.1-10 hr-1 (v/v).

In the isomerisation stage, isomerisation catalysts known in the art may be used. Suitable isomerisation catalysts contain a molecular sieve and/or a metal selected from Group VIII of the Periodic Table of Elements and/or a carrier. Preferably, the isomerisation catalyst contains SAPO-11 or SAPO-41 or ZSM-22 or ZSM-23 or ferrierite and Pt, Pd or Ni and $Al_2O_3$ or $SiO_2$. Typical isomerisation catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$. Most of these catalysts require the presence of hydrogen to reduce the catalyst deactivation.

Figure 2:
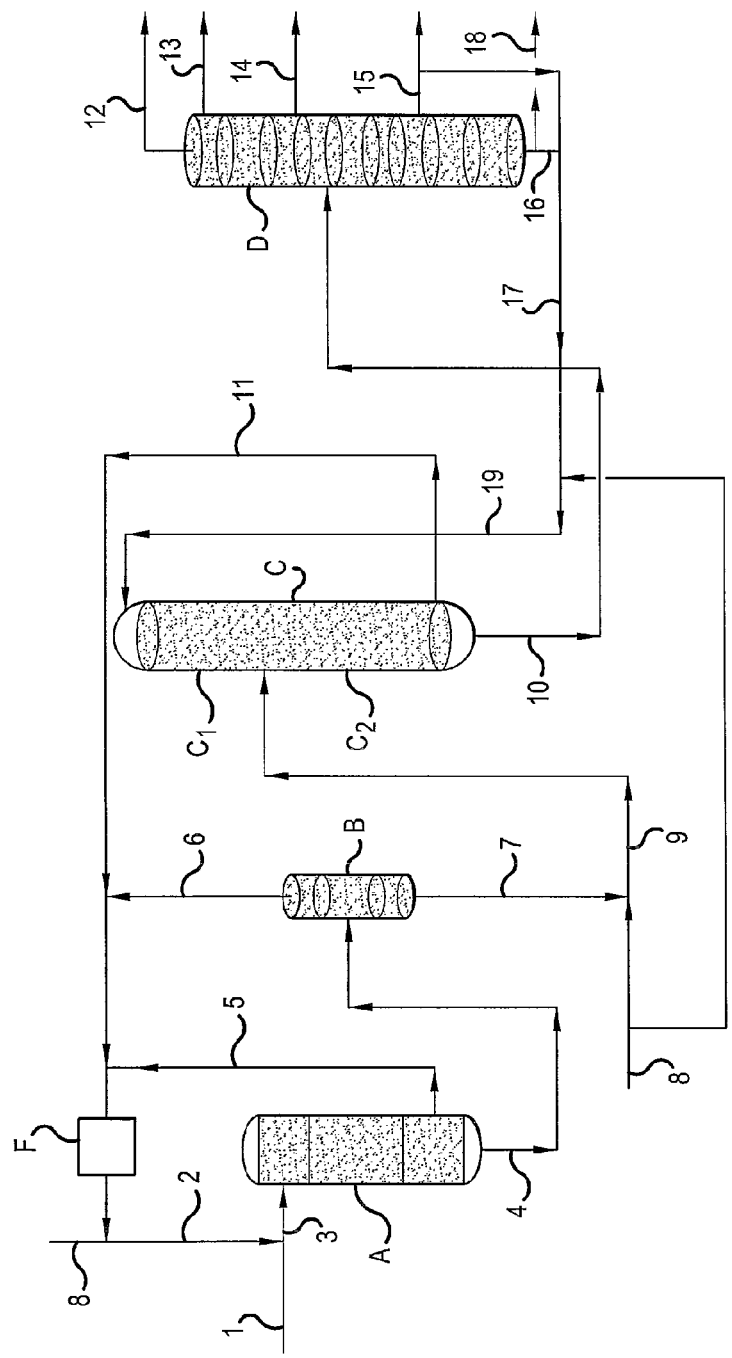
Figure 3:
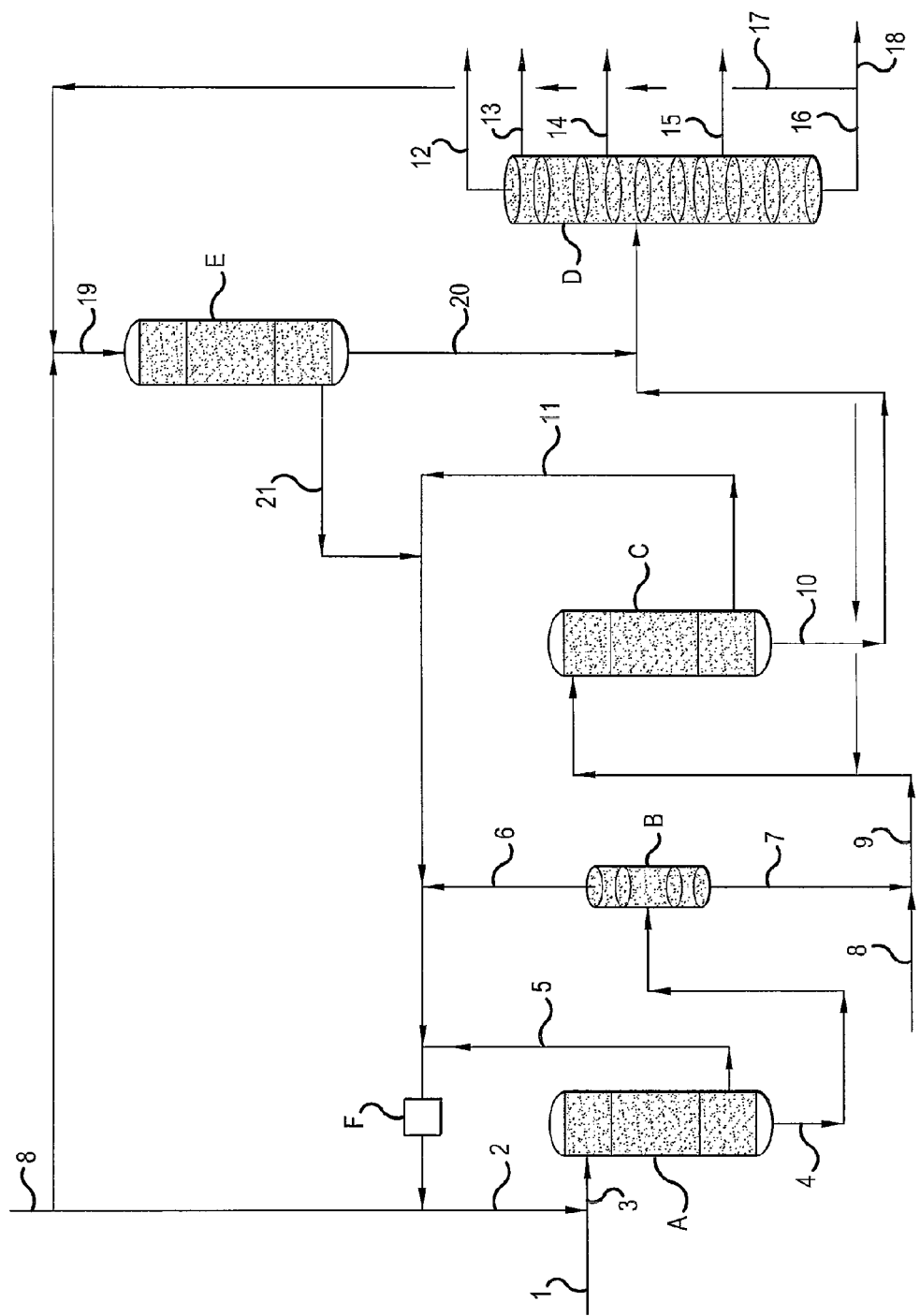

Preferable embodiments of the invention are those described in FIGS. 2 and 3.

In the embodiment described in FIG. 2 where the isomerisation reaction section C comprises at least two subsections $C_1$ and $C_2$ same or different catalysts and same of different temperatures may be used in each section.

In the alternative of the invention where the reisomerisation is carried out as a third stage (isomerisation) according to the embodiment described in FIG. 3, same or different catalysts and same or different reaction conditions may be used in each isomerisation stage. For example, in the first isomerisation stage the catalyst and/or reaction conditions may be selected as not favouring cracking and the catalyst and/or reaction conditions in the second isomerisation stage may be selected as promoting cracking, resulting in increased yields of the components or product with the desired cold properties.

The process yields hydrocarbon components suitable as bio jet fuels and as blending stocks for aviation fuels, and also components suitable as diesel fuel, gasoline and gas may be obtained.

Aviation fuels meeting the requirements of Jet A-1 may be obtained, containing the component manufactured using the process according to the invention, blended with conventional aviation fuels.

It was surprisingly found that isoparaffinic hydrocarbon components particularly suitable as high quality aviation fuels and components for aviation fuels can be obtained with very good yields from biological and renewable material and from any mixtures thereof. The aviation fuel yields are remarkably high. The heavy components formed during the hydrodeoxygenation stage (heavy recycle stream) are utilised in an efficient and economical way and they are converted to more valuable components having particularly good properties also at low temperatures, thus making them particularly suitable for aviation fuels. The conversion of C18 and C20 components in the process according to the invention is significantly higher when compared to a process where isomerisation is carried out once. Typically the heavy components are subjected to isomerisation and also to some extent cracking. The process comprising hydrodeoxygenation, isomerisation and reisomerisation results in a significant decrease of the freezing point of the product, which comprises highly branched isoparaffins. In the process according to the invention particularly the components boiling at higher temperatures and decreasing the freezing point and pour point are further processed to components having more favourable properties.

The product contains no olefins, no aromatic compounds or naphthenes, which decreases significantly the scaling of engines. The product is based on renewable materials and it contains no sulphur compounds.

The invention is further illustrated with the following example, which however are not intended to limit the scope the invention.

EXAMPLES

Example 1

In the first stage hydrodeoxygenation of palm oil was carried out in a fixed bed tube reactor. The reaction was carried out in the presence of NiMo catalyst under a pressure of 47 bar, with WHSV of 0.5 l/h and at a reaction temperature of 330° C. Hydrogen to oil ratio was around 1000 normal liters $H_2$ per liter oil feed. The product oil (n-paraffins) contained no oxygen compounds.

In the second stage the product oil obtained above was subjected to isomerisation in a fixed bed tube reactor in the presence of Pt-SAPO-catalyst under a pressure of 37 bar, with WHSV of 1.3 l/b and at a reaction temperature of 313° C. Hydrogen to oil ratio was around 300 normal liters $H_2$ per liter oil feed.

The product obtained from the isomerisation stage was fractionated and the heavy recycle stream (fraction boiling at and above 290° C.) was fed to the third stage (second isomerisation) where the reisomerisation was carried out in a fixed bed tube reactor in the presence of Pt-SAPO-catalyst under a pressure of 40 bar, with WHSV of 1.5 l/h and hydrogen to oil ratio of 300 normal liters $H_2$ per liter oil fed. The reaction temperature of 315° C. was used in the case the product was fractionated to diesel fuel EN590, 322° C. for aviation fuels, jet fuel 1 and 340° C. for jet fuel 2.

The characteristics of the product obtained from the first isomerisation, of the feed to the second isomerisation (heavy recycle stream) and of the final products the diesel fuel and aviation fuels and are presented in the following table 1.

TABLE 1

Characteristics of products

| Parameter | Method | Unit | Product from $1^{st}$ isom. | Feed to $2^{nd}$ isom. | EN590 Diesel | Jet fuel 1 | Jet fuel 2 |
|---|---|---|---|---|---|---|---|
| Cloud Point | ASTM D5773 | ° C. | −13 | 0.6 | −38.9 | −70.3 | −69.5 |
| Flash Point | EN ISO 2719-2002 | ° C. | 71 | | 64.5 | 60.5 | 54.5 |
| Freezing Point | | ° C. | −6 | | −33.5 | −60.5 | −56 |
| Smoke point | | mm | | | >50 | NA | >50 |
| Distillation | ASTM D86 | | | | | | |
| TA | | ° C. | 199 | 290 | 163 | 165 | 156 |
| 5 vol-% | | ° C. | 245 | 295 | 193 | 182 | 179 |
| 10 vol-% | | ° C. | 257 | 295 | 199 | 183 | 179 |
| 30 vol-% | | ° C. | | 296 | 246 | 194 | 196 |
| 50 vol-% | | ° C. | 279 | 297 | 276 | 207 | 214 |
| 70 vol-% | | ° C. | | 299 | 288 | 224 | 237 |
| 90 vol-% | | ° C. | 292 | 303 | 293 | 264 | 273 |
| 95 vol-% | | ° C. | 296 | 305 | 296 | 279 | 285 |
| TL | | ° C. | 306 | 325 | 309 | 287 | 291 |

The invention claimed is:

1. A process for producing hydrocarbons suitable for aviation fuel, said process comprising:
   a first stage wherein feed comprising a fatty acid and/or a fatty acid ester and/or a fatty acid anhydride of biological origin and hydrogen gas are subjected to conditions sufficient to effect hydrodeoxygenation in the presence of a hydrodeoxygenation catalyst to yield n-paraffins, wherein the conditions comprise a pressure between 10 and 150 bar, a temperature between 200 and 400° C., and the presence of a hydrogenation catalyst comprising a metal selected from Group VIII and/or VIB of the Periodic System of Elements;
   a second stage wherein the n-paraffins and hydrogen gas are subjected to conditions sufficient to effect isomerisation in the presence of an isomerisation catalyst contained in a first isomerisation reaction section to yield isoparaffins and separating fractions, wherein the conditions comprise a pressure between 10 and 150 bar, a temperature between 280 and 400° C., and the presence of an isomerization catalyst comprising a molecular sieve and/or a metal selected from Group VIII of the Periodic Table of Elements; and
   a third stage wherein a separated fraction of the separating fractions boiling at or above 200° C. temperature under atmospheric pressure obtained from the second stage is passed directly to a second isomerisation reaction section and subjected to conditions sufficient to effect reisomerisation to yield aviation fuel, wherein the conditions comprise a pressure between 10 and 150 bar, a temperature higher than the temperature in the second stage, and the presence of an isomerisation catalyst comprising a molecular sieve and/or a metal selected from Group VIII of the Periodic Table of Elements.

2. The process according to claim 1, wherein the fraction boiling at or above 200° C. temperature is combined with a fraction boiling in the diesel fuel range or part of it.

3. The process according to claim 1, wherein the produced hydrocarbons suitable for aviation fuel comprise isoparaffinic hydrocarbons and contain no olefins, aromatic compounds, naphthenes or sulphur compounds.

* * * * *